United States Patent
Lin et al.

(10) Patent No.: US 7,131,100 B2
(45) Date of Patent: Oct. 31, 2006

(54) IDENTIFYING PHANTOM IMAGES GENERATED BY SIDE-LOBES

(75) Inventors: Chin-Hsen Lin, Fremont, CA (US); Chi-Ming Tsai, Palo Alto, CA (US)

(73) Assignee: Synopsys Inc., Mountain View, CA (US)

( * ) Notice: Subject to any disclaimer, the term of this patent is extended or adjusted under 35 U.S.C. 154(b) by 731 days.

(21) Appl. No.: 10/316,275

(22) Filed: Dec. 10, 2002

(65) Prior Publication Data
US 2004/0111693 A1    Jun. 10, 2004

(51) Int. Cl.
G06F 17/50    (2006.01)
G06F 9/00    (2006.01)

(52) U.S. Cl. ............................ 716/19; 716/4; 382/144; 382/149

(58) Field of Classification Search .................... None
See application file for complete search history.

(56) References Cited

U.S. PATENT DOCUMENTS

| | | | |
|---|---|---|---|
| 6,401,236 B1* | 6/2002 | Baggenstoss et al. | 716/19 |
| 6,413,684 B1* | 7/2002 | Stanton | 430/5 |
| 6,453,457 B1* | 9/2002 | Pierrat et al. | 716/19 |
| 6,625,801 B1* | 9/2003 | Pierrat et al. | 716/19 |
| 6,653,026 B1* | 11/2003 | Pierrat et al. | 430/5 |
| 6,757,645 B1* | 6/2004 | Chang et al. | 703/13 |
| 6,760,892 B1* | 7/2004 | Taoka et al. | 716/4 |
| 6,873,720 B1* | 3/2005 | Cai et al. | 382/149 |
| 6,903,352 B1* | 6/2005 | Muraki et al. | 250/492.22 |
| 6,911,285 B1* | 6/2005 | Aleshin et al. | 430/5 |
| 2003/0115034 A1* | 6/2003 | Tsai et al. | 703/14 |

* cited by examiner

*Primary Examiner*—Leigh M. Garbowski
(74) *Attorney, Agent, or Firm*—Bever, Hoffman & Harms, LLP; Jeanette S. Harms (57) ABSTRACT

Features of a mask, when close enough to one another, can cause unwanted phantom images to print on an integrated circuit. Advantageously, potential locations of phantom images can be automatically identified from a mask layout. This technique can include creating perimeters or rings around features in the mask layout (in one case, after proximity correction). An overlap of perimeters/rings can be assigned a particular weight such that areas of greater overlap have a higher weight and areas of less overlap have a lower weight. If the weight of an overlap area exceeds a trigger weight, then an evaluation point can be added to the mask layout, thereby identifying that layout location as a potential location of a phantom image. After simulation of the mask layout, that layout location can be analyzed to determine if a phantom image would print.

22 Claims, 7 Drawing Sheets

IDENTIFYING PHANTOM IMAGES GENERATED BY SIDE-LOBES

BACKGROUND OF THE INVENTION

1. Field of the Invention

The invention relates to placing evaluation points for simulation based checking on a mask layout and, particularly, to identifying locations on the mask in which phantom images may occur and placing evaluation points at such locations.

2. Description of the Related Art

Photolithography is a well-known process used in the semiconductor industry to form lines, contacts, and other known structures in integrated circuits (ICs). In conventional photolithography, a binary mask having a pattern of transparent and opaque regions representing such structures in one IC layer is illuminated. The emanating light from the binary mask exposes a photoresist layer provided on a wafer. During a subsequent development process, portions of the photoresist layer are removed, wherein the portions are defined by the pattern of exposure. In this manner, the pattern of the binary mask is transferred to or printed on the photoresist layer.

Various types of masks have been developed to improve on the resolution provided by the binary mask. Such masks include a phase shifting mask (PSM), an attenuated PSM, and a tri-tone attenuated PSM. A PSM also includes transparent and opaque regions. However, the transparent regions include complementary phase shifters, which are configured such that the exposure radiation transmitted by one shifter is 180 degrees out of phase with the exposure radiation transmitted by the other shifter. An attenuated PSM includes transparent regions and attenuated phase shifting regions. The attenuated phase shifting region is a partially transparent region, i.e. a region having a low optical intensity transmission coefficient T<0.1. However, the phase shift of light passing through the attenuated phase shifting region relative to light passing through the transparent region is approximately 180 degrees. A tri-tone attenuated phase shifting mask further includes an opaque region within the larger portion(s) of the attenuated, phase-shifting region.

Figure 1:
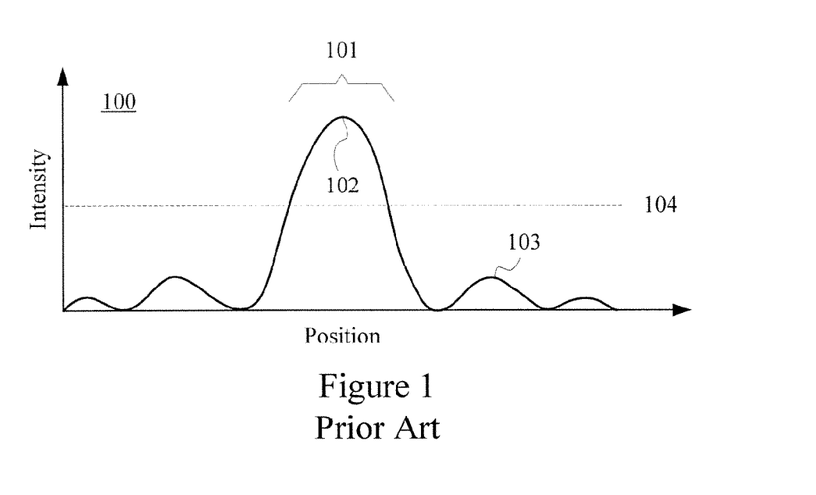
FIG. 1 illustrates a graph that plots light intensity as a function of position, wherein a broad central bright region in the graph has a maximum intensity at a point corresponding to the center of a transparent feature in a mask.

Light passing through a transparent feature of a mask sends a large fraction of the incident beam into well-defined directions. These directions depend on the wavelength of the light and the dimensions of the feature. For example, FIG. 1 illustrates a graph 100 that plots light intensity as a function of position. In graph 100, a broad central bright region 101 has a maximum intensity at a point 102 corresponding to the center of a transparent feature in the mask. At various positions, the intensity drops to zero, thereby indicating a destructive interference between different orders of diffraction. At a mask level, the first intensity drop to zero (or substantially zero) on either side of point 102 corresponds to the beginning of the opaque (or partially transparent) regions adjacent the transparent feature.

Of importance, a first side-lobe 103 has intensity less than a photoresist threshold 104. In this manner, for an isolated transparent region, first side-lobe 103 would not trigger exposing the photoresist. However, in the case of proximate transparent regions, their respective first side-lobes can constructively interfere with one another, i.e. their intensities could combine, thereby triggering exposure of the photoresist at that position. This exposure does not correspond to any desired shape on the mask and, therefore, is called a "phantom" image. This phenomenon is called a "side-lobe effect" and can occur irrespective of the type of mask being used.

Figure 2A:
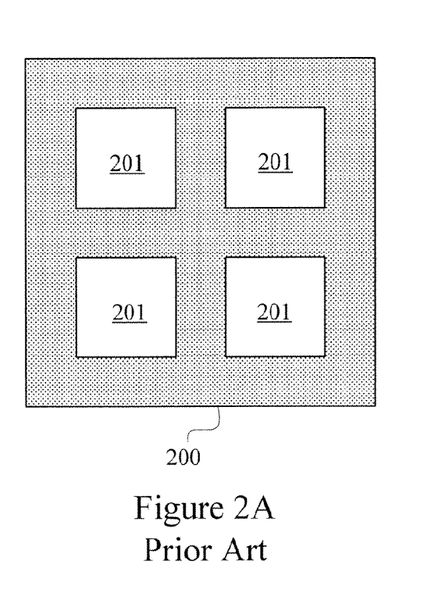
FIG. 2A illustrates a simplified mask layout including four transparent shapes that could be used to form contacts on a wafer.
Figure 2B:
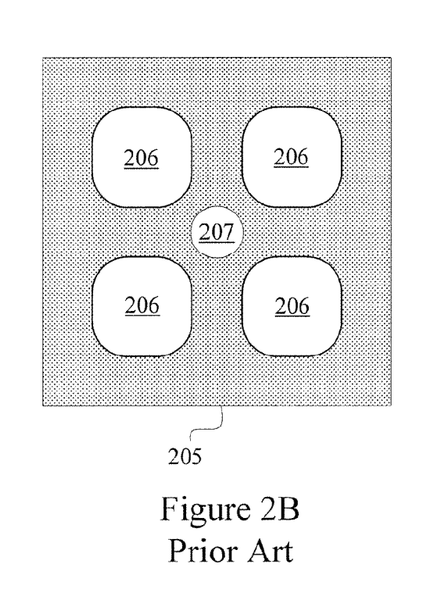
FIG. 2B illustrates an exemplary wafer after exposing a mask implementing the layout of FIG. 2A. The wafer includes an undesirable phantom image, which was created by side-lobes of transmitted light from the four transparent shapes.

For example, FIG. 2A illustrates a simplified mask layout 200 including four shapes 201 that could be used to form contacts on a wafer. In layout 200, shapes 201 represent transparent regions formed in an opaque or attenuated region. FIG. 2B illustrates a wafer 205 after exposing a mask that implements layout 200 (FIG. 2A). As shown in FIG. 2B, shapes 206, which are squares in mask 200 (i.e. shapes 201), actually print with rounded corners on wafer 205. Moreover, because of the constructive interference of first side-lobes of light transmitted through a mask implementing shapes 201, a phantom image 207 can print in the center of shapes 206 on wafer 205. This phantom image 207 could cause undesirable bridging with features on that layer and/or with features on other layers, thereby adversely affecting the functionality of the integrated circuit.

Of importance, side-lobes can also occur on a bright field mask in which opaque or attenuated features are formed on a transparent substrate. To represent an opaque feature in a bright field mask, graph 100 (FIG. 1) can be flipped on a vertical axis. In this case, the broad central region 101 would have a minimum intensity at a point 102 corresponding to the center of the opaque feature in the mask. At various positions, the intensity increases to a maximum intensity. At a mask level, the first intensity increase to the maximum intensity on either side of point 102 corresponds to the beginning of the transparent regions adjacent the opaque feature.

A side-lobe effect in a bright field mask could result in a dark node in what should be an exposed area. In other words, the dark node fails to trigger exposing of the photoresist, thereby creating a phantom image at the dark node location. Although subsequent embodiments herein refer to transparent features in a dark field mask, it is understood that the side-lobe problem and the solution to such side-lobe problem apply equally to both bright field masks with opaque features and dark field masks with transparent features.

Note that various resolution enhancement techniques, such as optical proximity correction (OPC), can also contribute to side-lobe effects on a layout. OPC applies systematic changes to geometries of the layout to improve the printability of a wafer pattern. Specifically, as the size of integrated circuit features drops to 0.18μ and below, the features can become smaller than the wavelength of the light used to create such features, thereby creating lithographic distortions when printing the features onto the wafer. As used herein, OPC can include all types of proximity correction, including optical, resist, etch, micro-loading, etc.

Rule-based OPC can include rules to implement certain changes to the layout, thereby compensating for some lithographic distortions. For example, to compensate for line-end shortening, rule-based OPC can add a hammerhead to a line end. Additionally, to compensate for corner rounding, rule-based OPC can add (or subtract) serif shapes from outer (or inner) corners. To maintain critical dimension (CD) control, assist bars can be added to isolated lines. These changes can form features on the wafer that are closer to the original intended layout.

In model-based OPC, a real pattern transfer can be simulated (i.e. predicted) with a set of mathematical formulas (i.e. models). In model-based OPC, the edges of a feature in a layout can be dissected into a plurality of segments, thereby allowing these segments to be individually moved to correct for proximity effects. The placement of the dissection points is determined by the feature shape, size, and/or position relative to other features.

OPC features, like shapes on the original layout, can also transmit light. Therefore, OPC features can also have, or enhance, side-lobes, which can constructively interfere with the side-lobes of proximate shapes (whether OPC features or shapes on the layout). For example, an assist bar is a sub-wavelength OPC feature that should not print on the wafer. However, if a side-lobe effect occurs, then such an assist bar might print on the wafer. This image (which could also be considered a phantom image because no corresponding segment of a feature exists on the original layout) could also cause undesirable bridging with features on that layer and/or with features on other layers, thereby adversely affecting the functionality of the integrated circuit.

Some commercially available simulation based checking tools can verify the accuracy of the original layout against the silicon it is intended to produce. For example, an exemplary simulation based checking tool can read in the layout and simulate various lithographic process effects, e.g. optical, resist, and etch effects. The simulation based checking tool can then compare the results, i.e. a simulated wafer image, with the original layout and report any out-of-tolerance regions. In this manner, the simulation based checking tool can determine the integrity of an integrated circuit layout and the correctness of its sub-wavelength mask design before silicon (i.e. mask and/or wafer) implementation. Note that the simulation based checking tool can be used for any layout in which resolution enhancement techniques (RETs) have been applied (e.g. OPC, assist bars, phase shifting, etc.).

Figure 3:
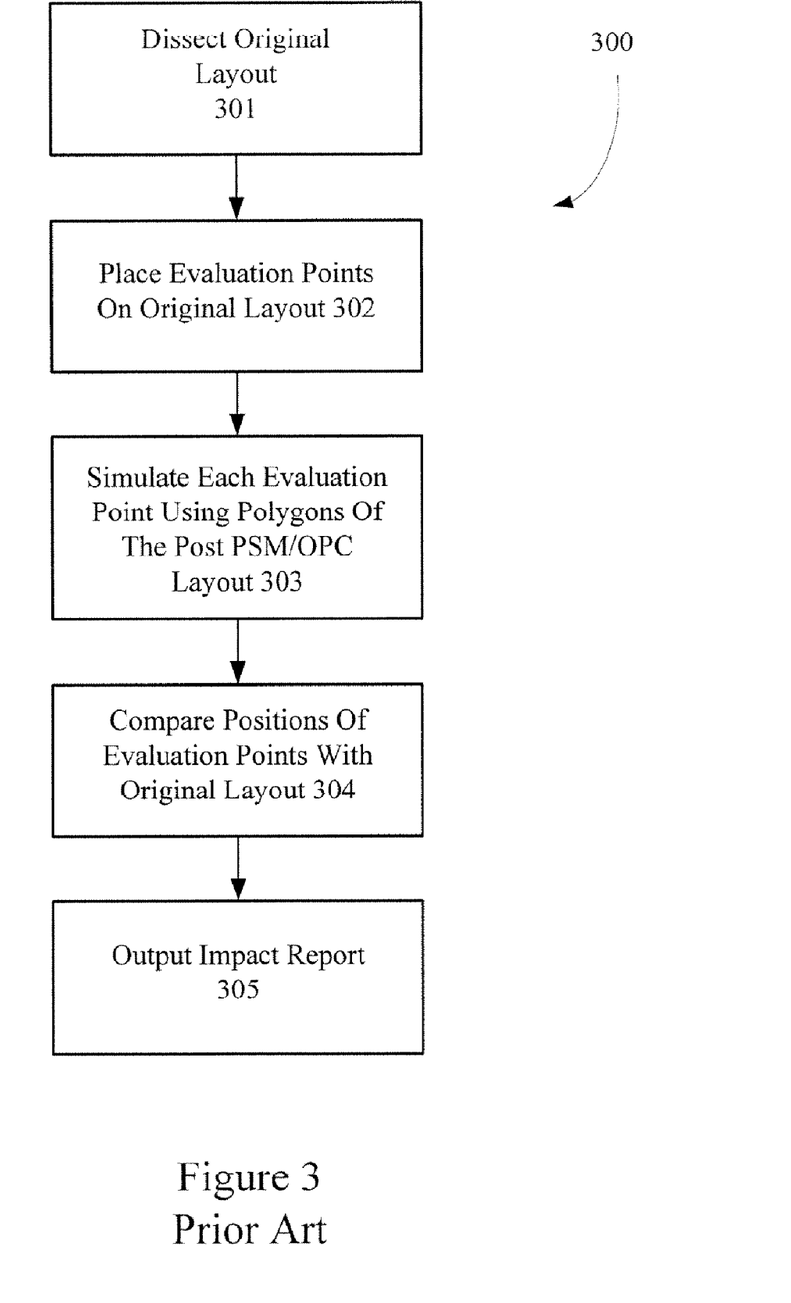
FIG. 3 illustrates an exemplary process that could be implemented by a simulation based checking tool.

FIG. 3 illustrates an exemplary process 300 that can be implemented by such a simulation based checking tool. In step 301, an original (i.e. a pre-OPC) layout can be dissected. At this point, evaluation points can be placed on the dissected edges of the original layout in step 302. In step 303, a wafer image for each evaluation point can be simulated using the post phase shifting/OPC layout. The simulated positions of the evaluation points can then be compared to those on the original layout in step 304. The impact report, which can be output in step 305, can indicate any differences in evaluation point location between the original layout and the simulated wafer image that are outside of tolerance.

In one embodiment, the impact report could include markers placed into the mask layout (e.g. post-OPC) indicating locations outside of tolerance. In another embodiment, the impact report could include evaluation point information stored in a table, wherein the rows could correspond to the evaluation points having a deviation greater than the set tolerance and the columns could correspond to the location (e.g. x and y coordinates) of the evaluation points. In another embodiment, the impact report could include a statistics table that can be used to calculate and/or provide the mean (average) deviation and the standard deviation for any selected group of evaluation points. In yet another embodiment, the impact report could include a cell table, which could provide information regarding specific cells in the layout. The cell table could include the number of control points, the simulation time for those control points is provided for various cells, and/or the number of reported errors for each cell. U.S. patent application Ser. No. 10/025, 414-4802, entitled "Method for Providing Flexible and Dynamic Reporting Capability Using simulation Tools", filed on Dec. 18, 2001, which is incorporated by reference herein, describes these tables in further detail.

Unfortunately, the locations of the phantom images do not correspond to segments of the original layout. Thus, a standard simulation based checking tool would not place evaluation points at these locations. In other words, the simulation based checking tool can check for the printing accuracy of features existing in the original layout, but not for the undesirable appearance of features not on the original layout.

Note that a process performance analysis tool, like the IC Workbench™ tool, licensed by Numerical Technologies, Inc., could generate an aerial image for every location on a layout, thereby permitting a human operator to detect any phantom images. However, this technique would be extremely expensive and time intensive, thereby rendering it commercially impractical. Alternatively, a process engineer could identify areas of potential phantom images. Unfortunately, the success of and time associated with such manual processes can vary significantly based on the experience of the process engineer. Therefore, a need arises for an automatic technique that can identify and check potential locations of phantom images on a mask layout.

SUMMARY OF THE INVENTION

Features of a mask, when close enough to one another, can cause unwanted features to print on an integrated circuit. These unwanted features, called phantom images, might cause bridging with other features on one or more layers of the integrated circuit, thereby adversely affecting the functionality of the integrated circuit. Phantom images do not have a corresponding feature on the original layout of the mask. Thus, many tools that verify the printing accuracy of a layout cannot predict these phantom images. Such tools are commonly referred to as simulation based checking tools. One such software tool is the SiVL™ software licensed by Numerical Technologies, Inc.

In accordance with one aspect of the invention, potential locations of phantom images can be automatically identified from a mask layout. This technique can include sizing up features in the mask layout by a predetermined amount (called a perimeter) or, alternatively, computing "rings" around the features. This sizing up/ring computation can be based on the first side-lobes, which are associated with light transmitted through transparent regions of a mask. Specifically, if two or more transparent features on a mask are closely spaced, then the light from their respective first side-lobes can combine (i.e. constructively interfere) to trigger an exposure of the photoresist on the wafer, just like a transparent feature on the mask. Similarly, if two or more opaque features on a mask are closely spaced, then their respective first side-lobes when combined can result in a failure to expose the photoresist on the wafer, just like an opaque feature on the mask. Hence, the printing of phantom images is called a side-lobe effect.

Therefore, if the features on the mask layout are closely spaced, some of their respective perimeters/rings will overlap. Advantageously, an overlap can be assigned a particular weight such that areas of greater overlap have a higher weight and areas of less overlap have a lower weight. For example, an overlap of two perimeters/rings could have a weight of "2", whereas an overlap of four perimeters/rings could have a weight of "4". Of importance, if a total weight of an overlap area exceeds a trigger weight, then an evaluation point can be added to layout corresponding to the overlap area during the checking process, thereby identifying that layout location as a potential location of a phantom image.

In one embodiment using perimeters, the size up amount can correspond to a first distance, which can be measured on a graph from either a maximum intensity of a transparent region (i.e. the middle of a transparent feature) or a minimum intensity of an opaque region (i.e. the middle of an opaque feature) to a last occurring significant intensity of the first side-lobe. In another embodiment, the rings can be computed by using the first distance as well as a second distance, which can be measured on the graph from either the maximum intensity of the transparent area or the minimum intensity of the opaque region (i.e. the middle of an opaque feature) to a first occurring significant intensity of the first side-lobe.

In one embodiment, the weight assigned to an overlap of rings can be based on the type of mask being analyzed. For example, an overlap of two perimeters/rings in an attenuating PSM layout could be given a higher weight than an overlap of two perimeters/rings in a binary mask layout because the attenuating PSM transmits more light than a binary mask (and therefore an overlap of first side-lobes would be more likely to trigger an exposure of the photoresist). In other words, the assigned weights can reflect the difference in intensities transmitted by masks implementing the layouts.

In another embodiment, the trigger weight can be adjusted based on the type of mask. For example, the trigger weight for an attenuated phase shifting mask can be lower than the trigger weight for a binary mask based on the different magnitudes of their side-lobes. In another embodiment, the trigger weight is adjusted based on wavelength, numerical aperture, layout design, mask set-up, and/or illumination characteristics.

The perimeter/ring overlap technique can further include performing proximity correction to the mask layout before sizing up or computing the rings for the features in the layout. In this case, the perimeters/rings would follow the profile of the corrected features (e.g. feature with hammerheads, serifs, etc.) in the layout. In one embodiment, if an assist bar is added to the mask layout during proximity correction, then an evaluation point corresponding to the location of the assist bar can be added to the layout, thereby identifying that location as a potential location of a phantom image.

In accordance with another feature of the invention, a method of generating an impact report for a mask layout is provided. In this method, the mask layout can be dissected and evaluation points can be placed on segments of the dissected mask layout. Proximity correction can be performed on the dissected mask layout to create a corrected mask layout. Features in the corrected mask layout can then be sized up by a predetermined amount or rings can be computed. Overlap areas caused by the sizing up/ring computation can be counted. If a total weight of an overlap area exceeds the trigger weight, then an evaluation point can be added to the overlap area. A wafer image of a portion of the corrected mask layout can be simulated. The simulated wafer image can then be compared with the original layout at the locations of the additional evaluation points.

A mask impact report, generated using the information from this comparison, can advantageously reflect any out-of-tolerance areas including phantom images. In one embodiment, the report can include a plurality of evaluation point locations and a corresponding plurality of deviations for the plurality of evaluation points. At least one deviation can indicate a difference between a desired feature location on a wafer and a corresponding simulated feature location. Additionally, at least one other deviation can indicate a phantom image that represents an undesirable, simulated feature on the wafer with no corresponding feature on the mask layout.

In accordance with another feature of the invention, an automatically generated mask layout file including potential locations of phantom images is also provided. The phantom image represents an undesirable feature on a wafer with no corresponding feature on the mask layout. The mask layout file can be generated by sizing up features in the mask layout by a predetermined amount or computing rings for the features, counting overlap areas caused by the sizing up/ring computation, and if a total weight of an overlap area exceeds a trigger weight, then adding an evaluation point to the overlap area to identify that location as a potential location of a phantom image.

In accordance with yet another feature of the invention, a method of eliminating phantom images created by features in a mask layout is also provided. This method also includes sizing up features in the mask layout by a predetermined amount or computing rings for the features, counting overlap areas caused by the sizing up/ring computation, and if a total weight of an overlap area exceeds a trigger weight, then adding an evaluation point to the overlap area to identify that location as a potential location of a phantom image. Additionally, the method includes simulating a wafer image of a portion of the mask layout including the evaluation point. In one embodiment, if a phantom image is generated at the evaluation point on the simulated wafer image, then a transparent area on the mask layout can be provided at the location of the evaluation point. Of importance, the light transmitted by the transparent area is approximately 180 degrees out of phase relative to light transmitted by features on the mask layout. In another embodiment, the transparent area can be placed substantially adjacent the evaluation point, wherein light transmitted by the transparent area is approximately the same phase relative to light transmitted by features on the mask layout. The transparent area could include a ring or multiple patches.

DETAILED DESCRIPTION OF THE FIGURES

Features of a mask, when close enough to one another, can cause phantom images to print on an integrated circuit. These phantom images might cause bridging with other features on one or more layers of the integrated circuit, thereby adversely affecting the functionality of the integrated circuit. Phantom images do not have a corresponding feature on the original layout of the mask. Thus, many tools that verify the printing accuracy of a layout cannot predict these phantom images.

In accordance with one feature of the invention, potential locations of phantom images can be automatically identified from a mask layout. This technique recognizes the importance of first side-lobes, which are associated with light transmitted through a transparent region of a mask. Specifically, if two or more transparent features on a mask are closely spaced, then the light from their respective first side-lobes can combine to trigger an exposure of the photoresist on the wafer, just like a transparent feature on the mask. Similarly, if two or more opaque features on a mask are closely spaced, then their respective first side-lobes when combined can result in a failure to expose the photoresist on the wafer, just like an opaque feature on the mask.

Figure 4:
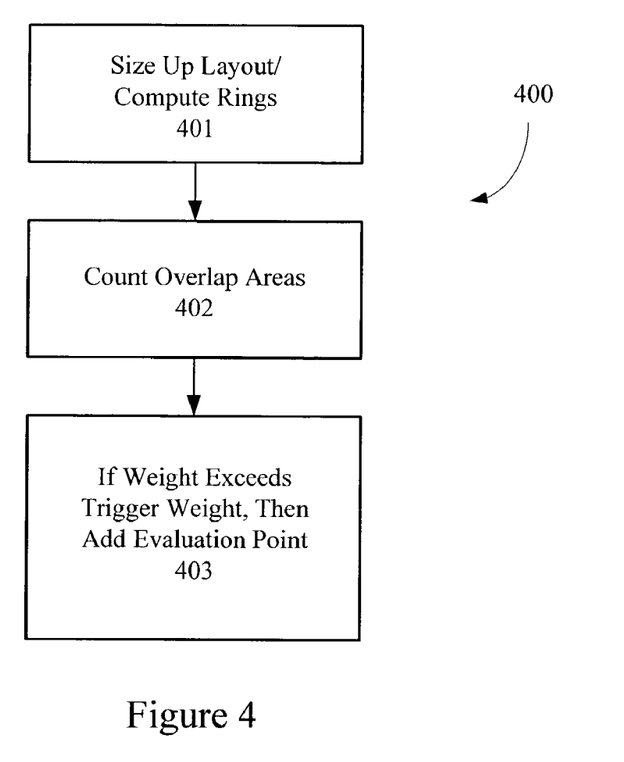
FIG. 4 illustrates an exemplary technique that can identify potential locations of phantom images.
Figure 5:
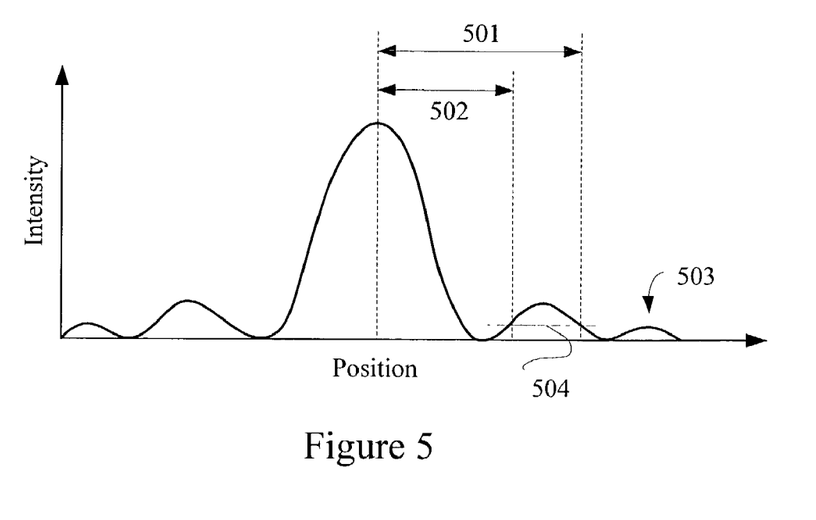
FIG. 5 illustrates two exemplary distances measured from a maximum intensity area on a graph that can correlate to rings of a sized-up feature on a layout.

FIG. 4 illustrates an exemplary process 400 that can identify potential locations of overlapping side-lobes from a mask layout. In step 401, features in a mask layout can be sized up a predetermined amount or, alternatively, a ring corresponding to the relevant intensities of the side-lobes can be computed. Referring to FIG. 5 and assuming a dark field mask, this predetermined amount could correspond to a distance 501, which is measured from the maximum intensity of a transparent region (which would correspond to the center of a transparent region, e.g. a feature, on a mask) to the last occurring significant intensity (indicated by intensity level 504) of the first side-lobe. The ring could correspond to distance 501 as well as a distance 502, which is measured from the maximum intensity of the transparent area to the first occurring significant intensity (i.e. intensity level 504) of the first side-lobe. In yet another embodiment, one or more additional distances related to the second side-lobe 503 could also be considered.

Note that in the case of a bright field mask (wherein the waveform of FIG. 5 is flipped on a vertical axis), this predetermined amount could still correspond to distance 501, which would then be measured from the minimum intensity of an opaque region (which would correspond to the center of an opaque region, e.g. a feature, on a mask) to the last occurring significant intensity (indicated by intensity level 504) of the first side-lobe. The ring could correspond to distance 501 as well as a distance 502, which is measured from the minimum intensity of the opaque area to the first occurring significant intensity (i.e. intensity level 504) of the first side-lobe. Determining distances 501, 502, etc. can further be based on the wavelength of the transmitting light ($\lambda$), the numerical aperture (NA), the partial coherence factor ($\sigma$), and the illumination type (i.e. on-axis, off-axis, quadrupole, etc.).

Figure 6A:
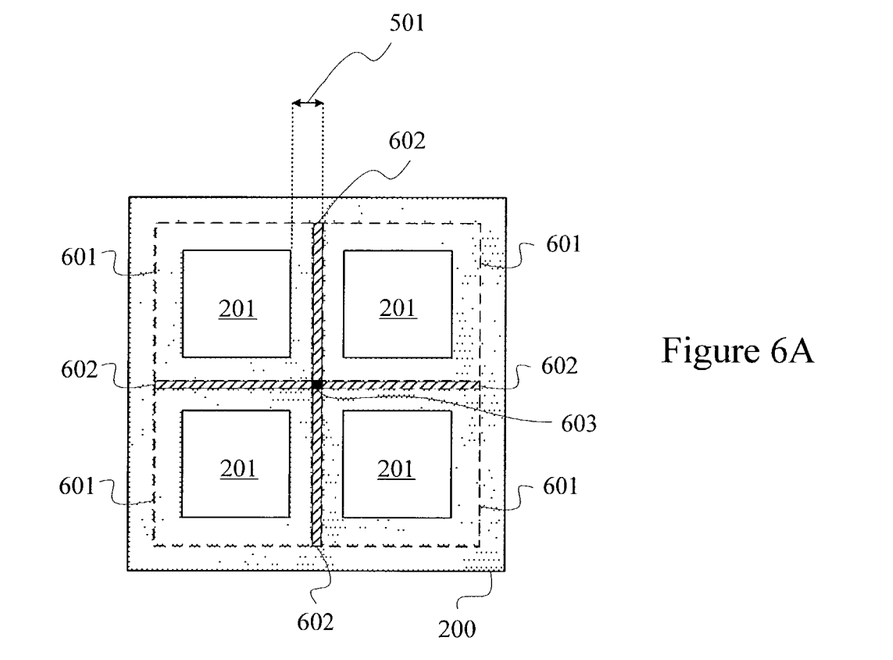
FIG. 6A illustrates a simplified mask layout after a size up operation.

FIG. 6A illustrates mask layout 200 (FIG. 2) after an exemplary size up operation in accordance with step 401 (FIG. 4). Specifically, shapes 201 now include corresponding perimeters 601. In this example, perimeters 601 can be based on distance 501 (FIG. 5), i.e. a single size up operation on each shape 201. Areas 602 indicate the areas defined by two overlapping perimeters 601 whereas area 603 indicates the area defined by four overlapping perimeters 601.

Figure 6B:
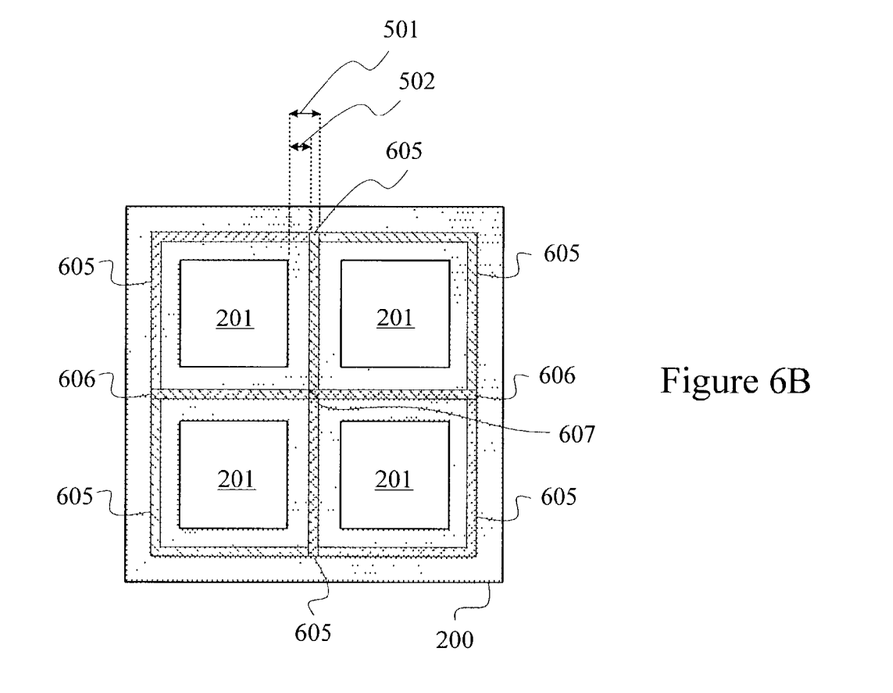
FIG. 6B illustrates a simplified mask layout after an exemplary ring operation.

FIG. 6B illustrates mask layout 200 (FIG. 2) after an exemplary ring operation in accordance with step 401 (FIG. 4). Specifically, shapes 201 now include corresponding rings 605. In this example, rings 605 can be based on distances 501 and 502 (FIG. 5). Areas 606 indicate the areas defined by two overlapping rings 605 whereas area 607 indicates the area defined by four overlapping rings 605. Note that the overlap areas in FIGS. 6A and 6B appears to be the same, but may not be depending on distances 501 and 502.

Referring back to FIG. 4, step 402 can include counting overlap areas. For example, in one embodiment, an overlap defined by two rings could be given a weight of "2" (see areas 602 in FIG. 6), an overlap defined by three rings could be given a weight of "3", and an overlap defined by four rings could be given a weight of "4" (see area 603 in FIG. 6). In other words, overlapping rings could be "added" together using an arithmetic OR operation. In some embodiments, an arithmetic OR operation can be used to compute the overlap count.

In step 403, if the weight given a particular overlap exceeds a trigger weight, then an evaluation point can be added to that location. This trigger weight indicates a high probability that a phantom image could print on the wafer. For example, in the embodiment shown in FIG. 6A, a trigger weight could be "3". Thus, area 603 in the mask layout could be marked with one or more evaluation points. In one embodiment, the center of area 603 could be marked with a single evaluation point. In this manner, after wafer simulation of a mask layout, the location marked with this evaluation point could be checked to determine whether a simulated phantom image was printed. In other embodiments, placing additional evaluation points, thereby allowing an estimation of size of area 603, could facilitate determining the effects of changing process parameters.

In one embodiment, different types of masks could have different weights assigned to overlapping perimeters/rings. For example, in an attenuating PSM layout, an overlap of two perimeters/rings could be given a weight of "4", whereas in a binary mask layout, an overlap of two perimeters/rings could be given a weight of "2". These weights can reflect the difference in intensities transmitted by such masks. In other words, because an attenuated area transmits more light than an opaque area, overlapping perimeters/rings on an attenuated PSM have a greater probability of printing phantom images compared to overlapping perimeters/rings on a binary mask. Thus, the weight assigned to overlapping perimeters/rings on an attenuated PSM can be increased relative to the weight assigned to overlapping perimeters/rings on a binary mask.

Alternatively, the trigger weight, i.e. the trigger weight in step 403, can be lowered for the attenuated PSM. For example, instead of using the trigger weight "3" (as described in reference to FIG. 6A), a trigger weight of "2" could be used for an attenuated PSM. The trigger weight could be adjusted based on various factors, including, for example, wavelength, numerical aperture, layout design, photoresist, post-exposure processing, and illumination characteristics (e.g. annular, off-axis, etc.).

In one embodiment of the invention, evaluation points can also be added to the original layout based on assist bars. Specifically, the location of the assist bars (which can be added during proximity correction operations, see step 302 of FIG. 3) typically coincides with distance 501 (FIG. 5).

Therefore, once assist bars are placed, the locations of such assist bars could be flagged with evaluation points.

Figure 7:
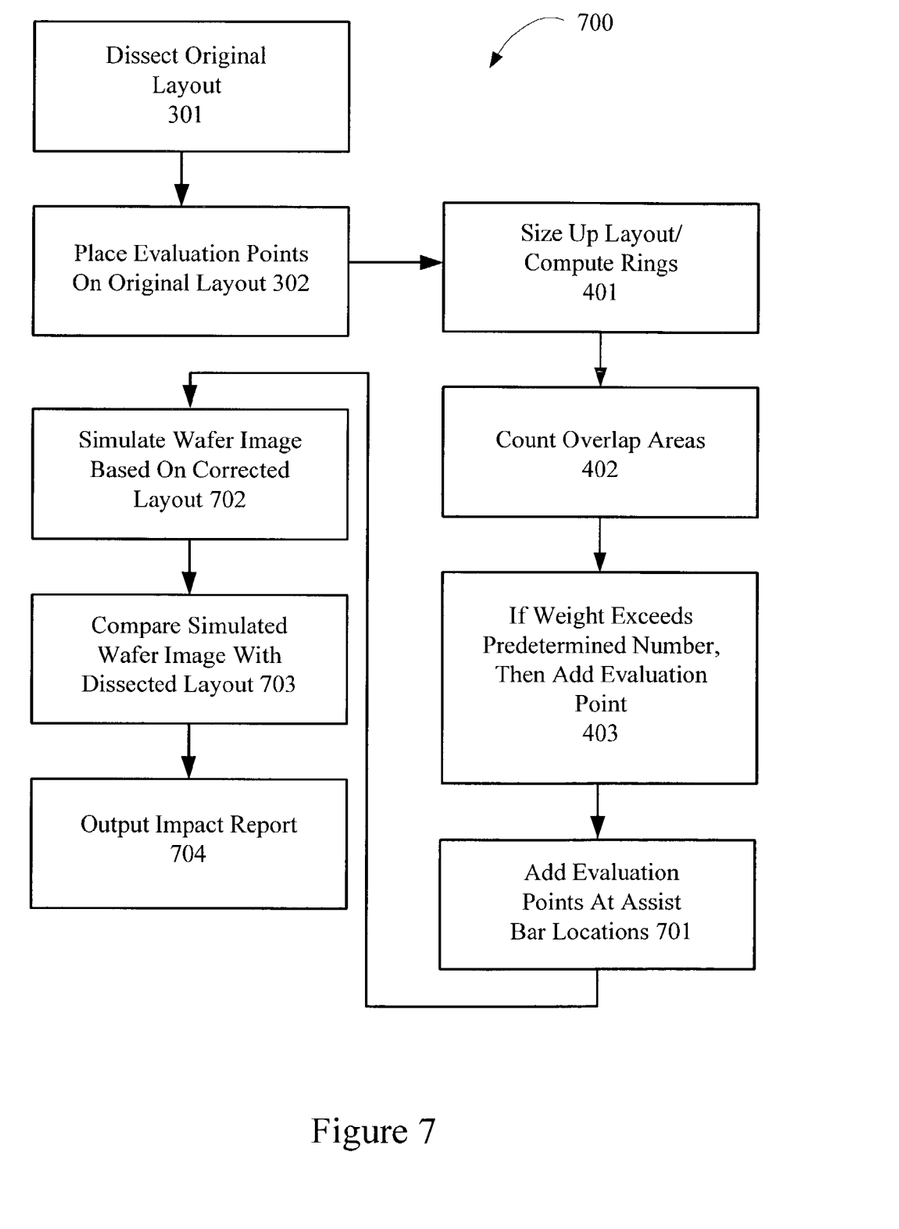
FIG. 7 illustrates an exemplary simulation based checking technique including a mask layout size up operation and an assist bar flag operation, both operations identifying locations for additional evaluation points.

For example, FIG. 7 illustrates an exemplary simulation based checking process 700 including a mask layout size up/ring computation operation and an assist bar flag operation, both operations identifying locations for additional evaluation points. In this embodiment, the original mask layout can be dissected (step 301) and evaluation points can be placed on the dissected edges (step 302) (both steps described in reference to FIG. 3). At this point, the layout size up/ring computation operation, including sizing up the layout or computing the rings, counting the overlap areas, and adding evaluation points based on weights assigned to the overlap areas (i.e. steps 401–403, respectively, and described in reference to FIG. 4), can be performed. Note that in some embodiments, OPC can be done between steps 302 and 401. In these embodiments, the OPC features can also be sized up (or rings computed) to determine where their side lobes fall. In yet other embodiments, such OPC features can be considered small enough that the perimeters/rings based on the original features of the layout provide an acceptable level of accuracy for image analysis.

In step 701, evaluation points can also be added to one or more assist bar locations on the dissected layout. Note that step 701 could alternatively be performed before steps 401–403. Of importance, both the size up operation and the flag operation can be performed before simulating the wafer image in step 702. In this manner, simulated results for all evaluation point locations can be compared with the dissected layout in step 703. In step 704, an impact report can be output. This impact report can advantageously include information regarding any phantom images generated by the layout. Note that obtaining an approximate location of a simulated phantom image is sufficient for the simulation based checking tool, such as the SiVL™ software, to flag out-of-tolerance areas.

Figure 8A:
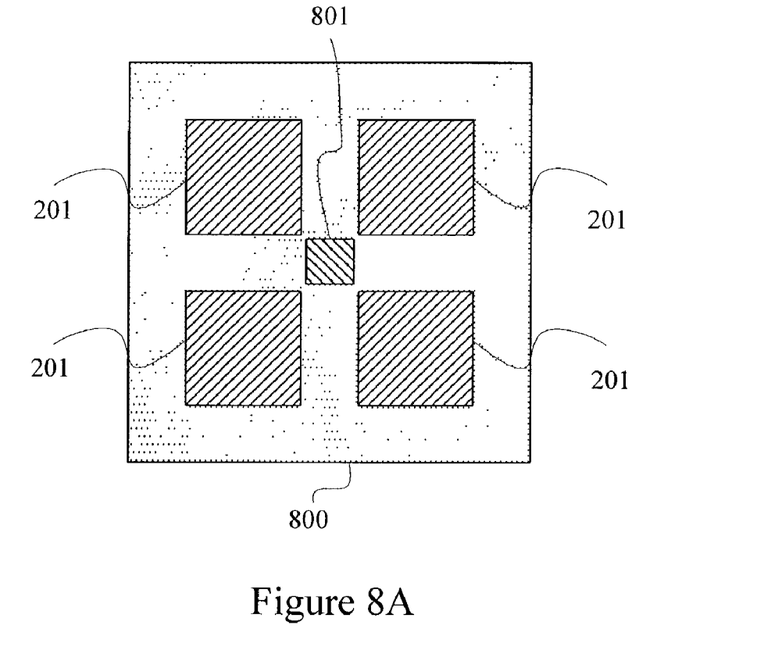
FIGS. 8A, 8B, and 8C illustrate exemplary corrections for the mask layout in FIG. 2 to eliminate a phantom image.
Figure 8B:
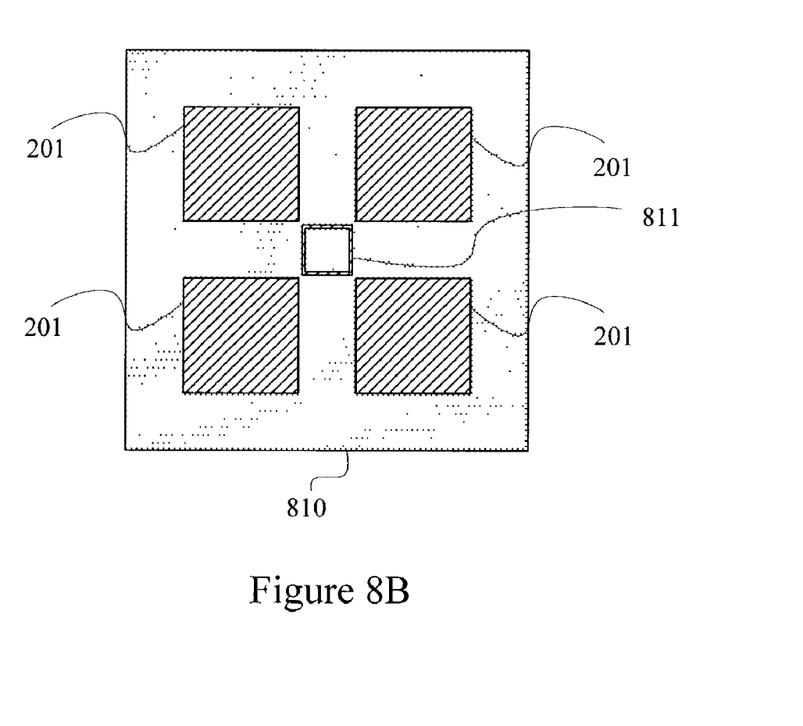
Figure 8C:
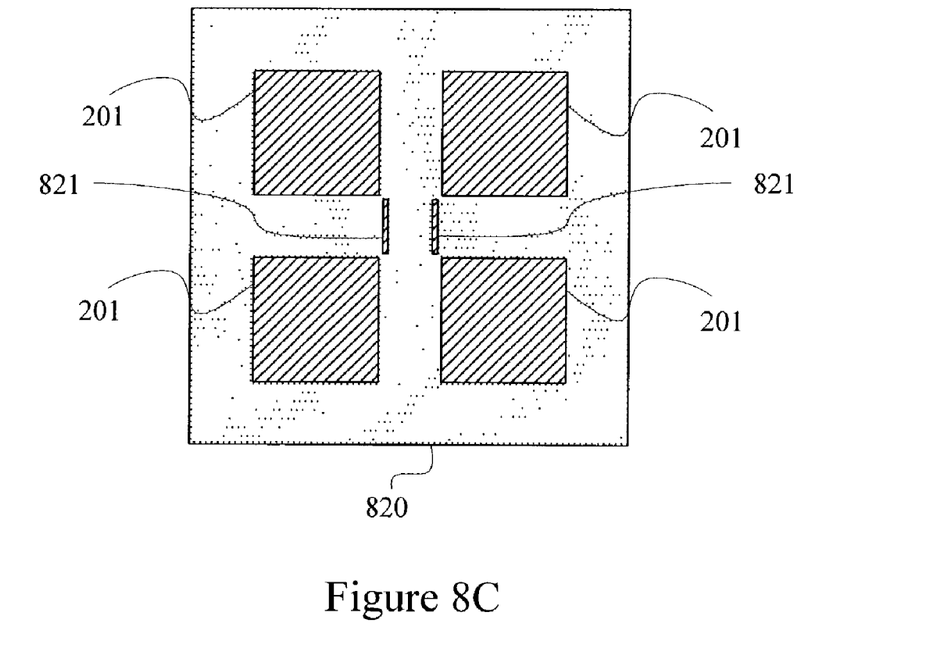

Once the locations of simulated phantom images are known, the layout can be modified to eliminate such images. For example, FIG. 8A illustrates an exemplary correction for layout 200 (FIG. 200). Specifically, layout 800 includes an area 801 that is transparent like areas 201. However, area 801 is formed such that the exposure radiation transmitted by it is 180 degrees out of phase with the exposure radiation transmitted by areas 201. FIG. 8B illustrates another exemplary correction for layout 200 (FIG. 200). Specifically, layout 810 includes a ring 811 that is transparent like areas 201. Ring 811 is formed such that the exposure radiation transmitted by it is in phase with the exposure radiation transmitted by areas 201. Ring 811 can be sized and placed to substantially correspond to an area immediately adjacent the side-lobes. In this manner, the negative side-lobes of ring 811 can negate the positive side-lobes of areas 201. FIG. 8C illustrates yet another exemplary correction for layout 200 (FIG. 200). Specifically, layout 820 includes patches 821 that are transparent like areas 201. Patches 821 are formed such that the exposure radiation transmitted by them is in phase with the exposure radiation transmitted by areas 201. Patches 821 also can be sized and placed to substantially correspond to an area immediately adjacent the side-lobes. Thus, the negative side-lobes of patches 821 can negate the positive side-lobes of areas 201.

In one embodiment, a tool performing model-based OPC could determine what type of layout correction can prevent printing. Note that such correction may result in the modification or elimination of previously placed proximity corrections. For example, the tool may modify or eliminate OPC features (e.g. serifs) that were placed on a contact layout, wherein the OPC features themselves (and not the original features of the mask layout) were predicted to cause one or more phantom images.

Although illustrative embodiments of the invention have been described in detail herein with reference to the accompanying figures, it is to be understood that the invention is not limited to those precise embodiments. They are not intended to be exhaustive or to limit the invention to the precise forms disclosed. As such, many modifications and variations will be apparent. The techniques described herein can be applied to any lithographic process technology, including ultraviolet, deep ultraviolet (DUV), extreme ultraviolet (EUV), x-ray, etc. Accordingly, it is intended that the scope of the invention be defined by the following Claims and their equivalents.

The invention claimed is:

1. A method of identifying potential locations of phantom images from a mask layout during simulation based checking, the method comprising:
    performing one of sizing up features in the mask layout by a predetermined amount and computing rings for the features in the mask layout;
    counting overlap areas caused by the performing;
    if a total weight of an overlap area exceeds a trigger weight, then adding an evaluation point to the overlap area on the mask layout to identify that location as a potential location of a phantom image; and
    performing the simulation based checking of the mask layout by simulating a wafer image at the potential location and comparing a result of the simulating to the location of the added evaluation point on the mask layout.

2. The method of claim 1, wherein the predetermined amount corresponds to a first distance, which can be measured on a graph from one of a maximum intensity of a transparent region and a minimum intensity of an opaque region to a last occurring significant intensity of a first side-lobe.

3. The method of claim 2, wherein a ring corresponds to a first distance, which can be measured on a graph from one or a maximum intensity of a transparent region and a minimum intensity of an opaque region to a last occurring significant intensity of a first side-lobe, and a second distance, which can be measured on the graph from one of the maximum intensity of the transparent region and the minimum intensity of the opaque region to a first occurring significant intensity of the first side-lobe.

4. The method of claim 2, wherein counting overlap areas includes assigning a weight to an overlap area.

5. The method of claim 4, wherein the weight is based on at least one of a type of mask, an illumination condition, and a post-exposure process.

6. The method of claim 4, wherein the trigger weight is adjusted based on at least one of a type of mask, an illumination condition, and a post-exposure process.

7. The method of claim 6, wherein the trigger weight for an attenuated phase shifting mask is lower than the trigger weight for a binary mask.

8. The method of claim 4, wherein the trigger weight is adjusted based on at least one of wavelength, numerical aperture, layout design, mask set-up, and illumination characteristics.

9. The method of claim 1, further including performing proximity correction to the mask layout preceding the sizing up.

10. The method of claim 9, wherein if an assist bar is added to the mask layout during proximity correction, then adding an evaluation point to a location of the assist bar, thereby identifying that location as a potential location of a phantom image.

11. A method of generating an impact report for mask layout during simulation based checking, the method comprising:
dissecting the mask layout and placing evaluation points on segments of the dissected mask layout;
performing one of sizing up features in the mask layout by a predetermined amount and computing rings for the features in the mask layout;
counting overlap areas caused by the performing; and
if a total weight of an overlap area exceeds a trigger weight, then adding an evaluation point to the overlap area;
simulating a wafer image of a portion of the mask layout;
comparing the simulated wafer image with the dissected layout including any additional evaluation points; and
outputting the impact report based on the comparing.

12. The method of claim 11, further including identifying locations of assist bars placed during a proximity correction and adding evaluation points at such locations.

13. An automatically generated mask layout file including potential locations of phantom images, a phantom image representing an undesirable feature on a wafer with no corresponding feature on the mask layout, the mask layout file generated by:
performing one of sizing up features in the mask layout by a predetermined amount and computing rings for the features in the mask layout;
counting overlap areas caused by the performing; and
if a total weight of an overlap area exceeds a trigger weight, then adding an evaluation point to the overlap area to identify that location as a potential location of a phantom image.

14. A method of eliminating phantom images created by features in a mask layout, the method comprising:
performing one of sizing up features in the mask layout by a predetermined amount and computing rings for the features in the mask layout;
counting overlap areas caused by the performing;
if a total weight of an overlap area exceeds a trigger weight, then adding an evaluation point to the overlap area to identify that location as a potential location of a phantom image;
simulating a wafer image of a portion of the mask layout including the evaluation point; and
if a phantom image is generated at the evaluation point on the simulated wafer image, then providing a transparent area on the mask layout at the evaluation point, wherein light transmitted by the transparent area is approximately 180 degrees out of phase relative to light transmitted by features on the mask layout.

15. A method of eliminating phantom images created by features in a mask layout, the method comprising:
performing one of sizing up features in the mask layout by a predetermined amount and computing rings for the features in the mask layout;
counting overlap areas caused by the performing;
if a total weight of an overlap area exceeds a trigger weight, then adding an evaluation point to the overlap area to identify that location as a potential location of a phantom image;
simulating a wafer image of a portion of the mask layout including the evaluation point; and
if a phantom image is generated at the evaluation point on the simulated wafer image, then providing a transparent area on the mask layout substantially adjacent the evaluation point, wherein light transmitted by the transparent area is approximately a same phase relative to light transmitted by features on the mask layout.

16. The method of claim 15, wherein the transparent area includes a ring.

17. The method of claim 15, wherein the transparent area includes multiple patches.

18. A method of identifying potential locations of phantom images from a mask layout, the method comprising:
performing one of sizing up features in the mask layout by a predetermined amount and computing rings for the features in the mask layout;
counting overlap areas caused by the performing; and
if a total weight of an overlap area exceeds a trigger weight, then adding an evaluation point to the overlap area to identify that location as a potential location of a phantom image.

19. The method of claim 18, wherein counting overlap areas includes assigning a weight to an overlap area.

20. The method of claim 19, wherein the trigger weight is adjusted based on at least one of wavelength, numerical aperture, layout design, mask set-up, and illumination characteristics.

21. The method of claim 18, further including performing proximity correction to the mask layout preceding the performing.

22. The method of claim 21, wherein if an assist bar is added to the mask layout during proximity correction, then adding an evaluation point to a location of the assist bar, thereby identifying that location as a potential location of a phantom image.

* * * * *